(12) United States Patent
Feldman et al.

(10) Patent No.: US 8,015,350 B2
(45) Date of Patent: Sep. 6, 2011

(54) BLOCK LEVEL QUALITY OF SERVICE DATA IN A DATA STORAGE DEVICE

(75) Inventors: Timothy R. Feldman, Louisville, CO (US); Jonathan W. Haines, Boulder, CO (US); William B. Raspotnik, Longmont, CO (US); Craig W. Miller, Loveland, CO (US); Edwin Scott Olds, Fort Collins, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 159 days.

(21) Appl. No.: 11/545,185

(22) Filed: Oct. 10, 2006

(65) Prior Publication Data

US 2008/0086593 A1    Apr. 10, 2008

(51) Int. Cl.
*G06F 12/00* (2006.01)
(52) U.S. Cl. ............ 711/112; 711/E12.103; 714/47.1
(58) Field of Classification Search .......... 711/112; 714/47.1
See application file for complete search history.

(56) References Cited

U.S. PATENT DOCUMENTS

| | | | |
|---|---|---|---|
| 4,527,251 A * | 7/1985 | Nibby et al. | 714/8 |
| 5,109,304 A * | 4/1992 | Pederson | 360/51 |
| 5,142,515 A * | 8/1992 | McFerrin et al. | 369/30.11 |
| 5,870,243 A | 2/1999 | Ukani et al. | |
| 5,878,020 A * | 3/1999 | Takahashi | 369/59.25 |
| 5,995,308 A | 11/1999 | Assouad et al. | |
| 6,185,063 B1 | 2/2001 | Cameron | |
| 6,349,064 B1 * | 2/2002 | Nakaoka | 365/200 |
| 6,434,326 B1 * | 8/2002 | Kondo et al. | 386/125 |
| 6,460,111 B1 * | 10/2002 | Shinohara | 711/103 |
| 7,082,007 B2 | 7/2006 | Liu et al. | |
| 2005/0132126 A1 | 6/2005 | Lin et al. | |
| 2005/0188169 A1* | 8/2005 | Fujibayashi | 711/170 |
| 2006/0037039 A1 | 2/2006 | Aaltonen | |

* cited by examiner

*Primary Examiner* — Reginald Bragdon
*Assistant Examiner* — Victor Wang
(74) *Attorney, Agent, or Firm* — Fellers, Snider, et al.

(57) ABSTRACT

Method and apparatus for using block level quality of service (QOS) data in a data storage device. A memory space is provided with a plurality of physical data storage blocks, such as data sectors on a magnetic disc. The QOS data identify at least one QOS characteristic for each of the available blocks. Transfers of user data between the blocks and a host device are preferably carried out in relation to the QOS data. In some preferred embodiments, the QOS data identifies a certification state for each of the blocks. In this way, the device is manufactured with less than all of the blocks having been successfully certified, and the remaining blocks are certified by the device during field use. In other preferred embodiments, the QOS data include a virus scan status, an access history, a write status, or an overlapped track indication for each said block.

29 Claims, 6 Drawing Sheets

BLOCK LEVEL QUALITY OF SERVICE DATA IN A DATA STORAGE DEVICE

FIELD OF THE INVENTION

The claimed invention relates generally to the field of data storage systems and more particularly, but not by way of limitation, to an apparatus and method for using block level quality of service data in a data storage device.

BACKGROUND

Data storage devices are used to access digital data in a fast and efficient manner. At a host level, user data are often structured in terms of variable length files, which can be constituted from one or more fixed sized logical blocks (such as logical block addresses, LBAs).

To store or retrieve user data with an associated data storage device, host commands are generally issued to the device using a logical block convention. The device carries out an internal conversion of the LBAs to locate the associated physical blocks (e.g., sectors) of media on which the data are to be stored, or from which the data are to be retrieved.

When the data storage device is characterized as a disc drive, a controller may be used to execute a seek command to move a data transducer adjacent a rotating magnetic recording disc and carry out the data transfer operation with the associated physical sector(s). Other types of data storage devices generally carry out other types of access operations to transfer the associated data.

Additional types of data can be provided at a host level to associate certain types of information with a particular file. Sometimes referred to as metadata, these types of data can include for example timestamp, content type and/or source, storage location, and error recovery (RAID) information for the associated files to aid in data transfer operations between the storage device and a host.

With continued demands for data storage devices with ever higher data storage and data transfer capabilities for a wide range of data types, there remains a continual need for improvements in the manner in which data transfer operations are managed between storage devices and host devices. It is to these and other improvements that preferred embodiments of the present invention are generally directed.

SUMMARY OF THE INVENTION

Preferred embodiments of the present invention are generally directed to an apparatus and method for using block level quality of service (QOS) data, such as in a data storage device.

A memory space is provided with a plurality of physical data storage blocks which are available to store user data for a host device. QOS data are stored in the memory space to identify at least one QOS characteristic for each of the available blocks.

Transfers of user data between the blocks and a host device are preferably carried out in relation to the QOS data, and the QOS data are preferably updated in response to each such transfer.

In some preferred embodiments, the QOS data identifies a certification state for each of the blocks. In this way, the device is manufactured with less than all of the blocks having been successfully certified, and remaining blocks are certified by the device during field use. In other preferred embodiments, the QOS data include a virus scan status, an access history, a write status, or an overlapped track indication for each said block.

These and various other features and advantages which characterize the claimed invention will become apparent upon reading the following detailed description and upon reviewing the associated drawings.

DETAILED DESCRIPTION

Figure 1:
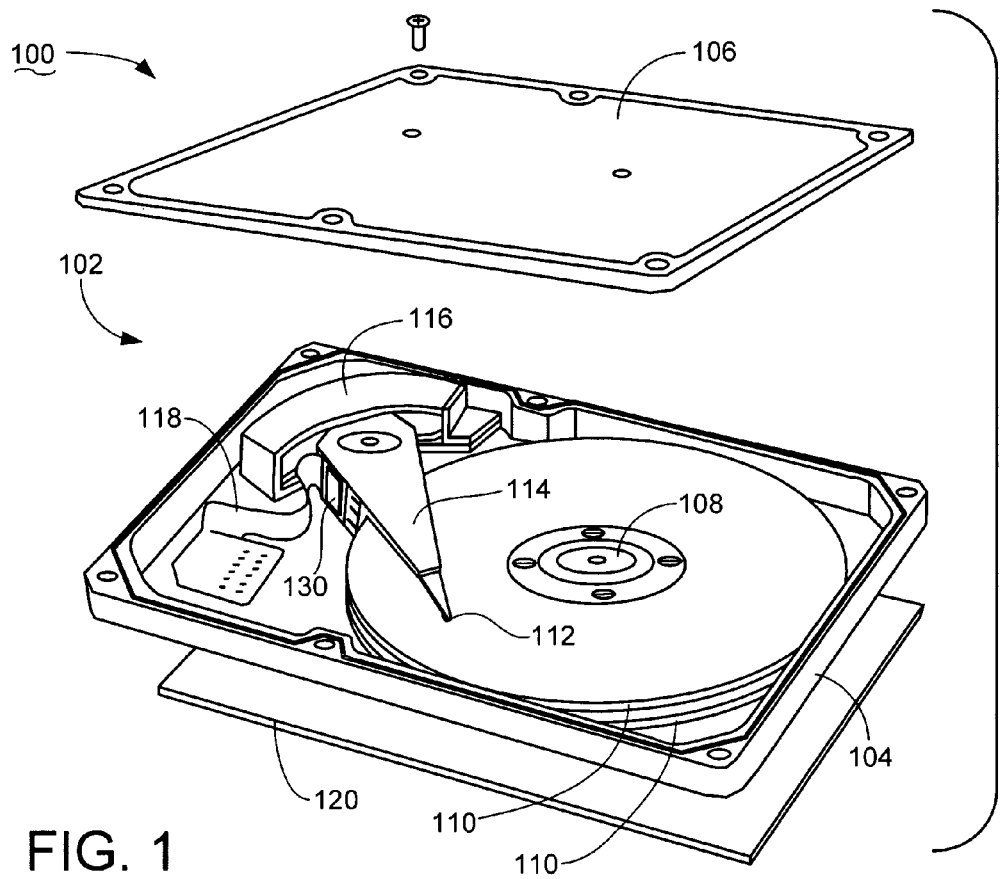
FIG. 1 is an exploded view of a data storage device constructed and operated in accordance with preferred embodiments of the present invention.

FIG. 1 shows an exploded view of a data storage device 100 to provide an exemplary environment in which preferred embodiments of the present invention can be advantageously practiced. The device 100 is preferably characterized as a hard disc drive of the type used to store and retrieve digital data in a computer system or network, consumer device, etc.

The device 100 includes a rigid, environmentally controlled housing 102 formed from a base deck 104 and a top cover 106. A spindle motor 108 is mounted within the housing 102 to rotate a number of data storage media 110 at a relatively high speed.

Data are arranged on the media 110 in concentric tracks which are accessed by a corresponding array of data transducing heads 112. The heads 112 (transducers) are supported by an actuator 114 and moved across the media surfaces by application of current to a voice coil motor, VCM 116. A flex circuit assembly 118 facilitates communication between the actuator 114 and control circuitry on an externally mounted printed circuit board, PCB 120.

Figure 2:
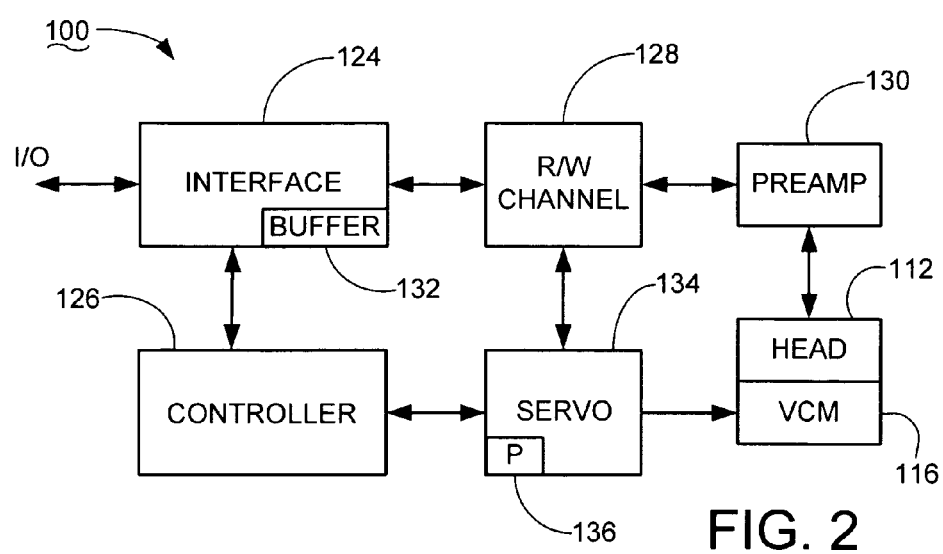
FIG. 2 is a generalized functional block diagram of the device of FIG. 1.

As shown in FIG. 2, the control circuitry preferably includes an interface (I/F) circuit 124 which communicates with a host device using a suitable interface protocol. A top level controller 126 provides top level control for the device 100 and is preferably characterized as a programmable, general purpose processor with suitable programming to direct the operation of the device 100.

A read/write (R/W) channel 128 operates in conjunction with a preamplifier/driver circuit (preamp) 130 to write data to and to recover data from the media 110. A buffer 132 of the I/F circuit 124 temporarily stores data received from the host to be written to the media (write-back data), as well as data recovered from the media prior to transfer to the host (readback data).

A servo circuit 134 provides closed loop positional control for the heads 112. The servo circuit 134 preferably comprises a servo processor 136 (such as a DSP or ARM) and is configured to carry out seek operations to move a selected transducer 112 from an initial track to a destination track, as well as track following operations wherein the selected transducer 112 follows a selected track.

Figure 3:
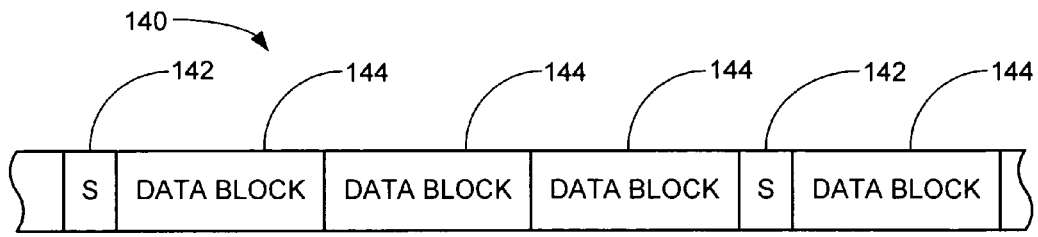
FIG. 3 provides a representation of a generalized format for a selected track of the device of FIG. 1.

A preferred configuration for each of the tracks on the media 110 is set forth at 140 in FIG. 3. An embedded servo scheme is employed in which radially arranged servo (S) sectors 142 are prewritten during device manufacturing. The servo sectors 142 provide data to the servo circuit 134 including intra-track positional information to permit the servo circuit to determine positional error of the associated transducer 112 during seeking and track following.

Data blocks 144 are defined in the spaces between adjacent servo sectors 142. The data blocks 144 are individually addressable physical blocks, or sectors, that are each configured to store up to a selected amount of internal or user data (e.g., 512 bytes).

The servo data of the servo sectors 142 preferably extend radially across the media surfaces (like spokes of a wheel) and provide di-bit patterns that are used to set the locations of the various data blocks 144 as desired. Thus, reference herein to "tracks" will be understood to refer to the radial alignment of a particular chain of data blocks 144 around the center of the associated medium 110, whether in a discrete ring or along a spiral path.

Figure 4:
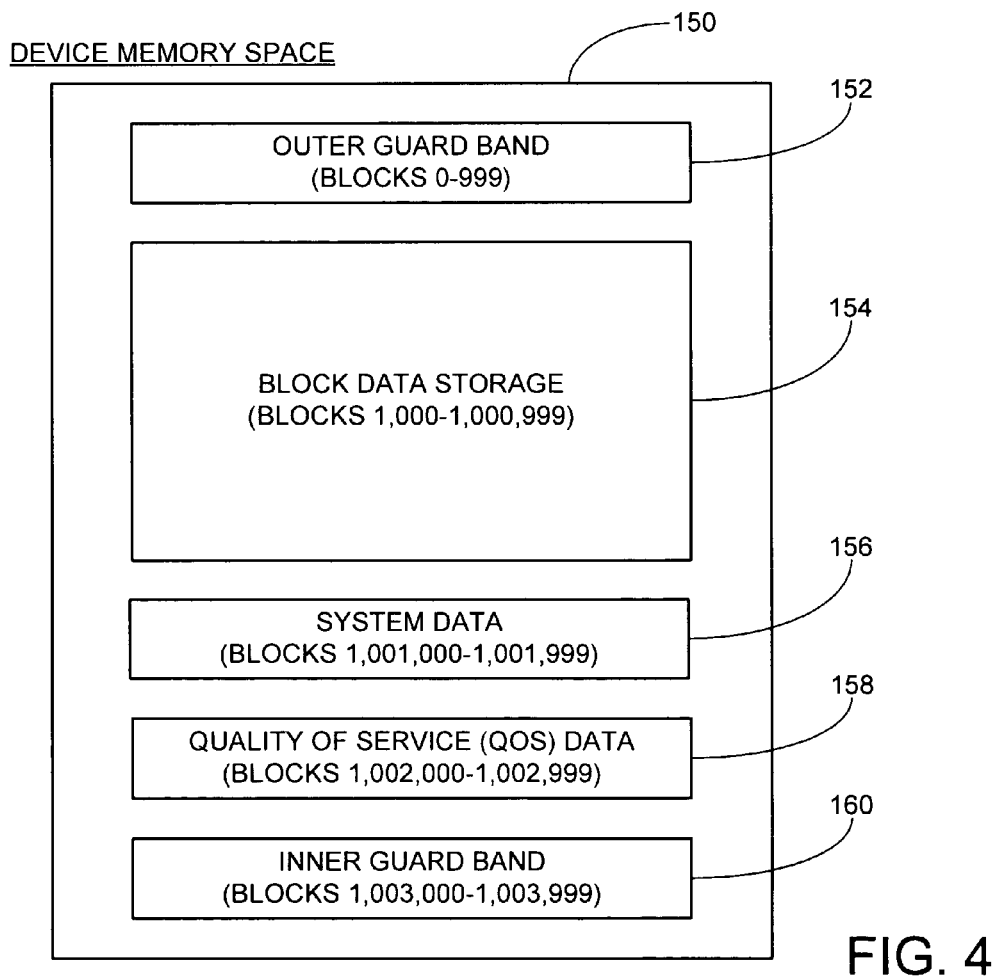
FIG. 4 shows a generalized representation of a top level format for a memory space of the device, the format including quality of service (QOS) data associated with various physical blocks used to store user data.

An exemplary memory space 150 of the device 100 is generally represented in FIG. 4. It will be appreciated that the space 150 preferably represents all or some of storage capacity of the device 100, so that the map can be viewed as a simplified representation of the data blocks 144 from each of the utilized media surfaces. Alternatively, a separate memory space as set forth in FIG. 4 can be defined for each media surface, as desired. The memory space 150 can further be extended to include other types of memory locations within the device 100, such as volatile (e.g. DRAM) and non-volatile (e.g., flash) memory.

The memory space 150 in FIG. 4 is shown to encompass a total of 1.4 million physical data blocks 144 (blocks 0 to 1,003,999), although this is merely for illustration and is not limiting. A first set of these blocks 144 is identified by outer guard band portion 152. The outer guard band portion 152 contains the first 1,000 blocks (0-999). These blocks 144 are adjacent the outermost peripheral edge of the media and are preferably unused.

A block data storage portion 154 serves as the primary set of blocks 144 used to store user data from the host. This portion 154 is shown to have 1 million blocks (1,000-1,000,999). Preferably, the physical blocks 144 in portion 154 are identified with corresponding logical block addresses (LBAs) at the host level. For example, the block 144 at physical block address (PBA) 1,000,000 may be assigned an LBA of 0, and so on.

During a data transfer operation with the storage portion 154, a host access command is preferably provided in terms of a selected number of LBAs to which data are to be written or from which data are to be read. The controller 126 (FIG. 1) carries out an LBA-to-PBA conversion to locate the corresponding PBAs associated with the host access command. The servo circuit 134 then moves the associated transducer 112 to a position adjacent the PBAs to carry out the respective write or read operation therewith.

A system data portion 156 is shown to encompass the next 2,000 blocks 144 (1,001,000-1,001,999). The system data portion 156 is preferably used to store programming routines and control data utilized by the device 100 during operation (e.g., the controller 126 and/or the servo processor 136). These routines and data are preferably loaded into a separate memory space, such as the buffer 132, during device initialization.

A quality of service (QOS) data portion 158 preferably encompasses the next 3,000 blocks (i.e., blocks 1,002,000-1,002,999). As explained below, the QOS data provide characteristic data relating to other physical data blocks, such as the host addressable blocks 144 of portion 154. As with the contents of the system data portion 154, the QOS data 156 can be loaded into a suitable memory location for access during device initialization, or can be accessed as needed during device operation.

Finally, FIG. 4 shows an inner guard band portion 160 comprising the innermost 3,000 data blocks 144 (1,003,000-1,003,999). As with the outer guard band portion 152, the inner guard band portion 160 serves as an innermost guard band and the blocks 144 therein are preferably not used.

The QOS data of portion 158 can take a number of forms, depending on the requirements of a given application. A variety of different preferred utilizations of the QOS data will now be discussed in turn.

Certification Test Status

As will be recognized by those having skill in the art, devices such as 100 often undergo various types of manufacturing testing prior to shipment of the device for field use by an end user. Such testing can include what is sometimes referred to as certification testing wherein individual data storage blocks are certified, or verified as operational, prior to release for subsequent storage of user data.

This testing can take a variety of forms, such as through the sequential writing and reading of special test patterns to the blocks 144. This allows defective blocks to be reallocated or otherwise removed from potential user service using defect mapping techniques, etc.

Historically, device manufacturers have generally endeavored to complete the certification testing of all data sectors on a device prior to shipment. This ensures that the device is fully operational and ready to accept data at all LBA locations from the moment the device is received by the end user.

Limitations with this approach, however, include the fact that such certification testing can take several hours, if not days, to complete. Indeed, the greater the data capacity of the device, the higher the number of blocks and hence, the longer such certification testing will generally take.

An associated observation made by the present inventors is that, generally, upon shipment a data storage device is often not immediately loaded up to full capacity with user data. In a PC environment, certain types of data such as host operating systems and software applications may be initially stored on a device, but typically the device is intended to be provided to the end user in such a way as to provide a relatively large available (i.e., blank) memory space to accommodate, over time, whatever future data storage requirements the end user may have. Indeed, some storage devices reach the end of their operational life without ever having been completely filled to capacity with user data.

Accordingly, in some preferred embodiments of the present invention the device 100 is manufactured in such a way that less than all of the blocks 144 in the block data storage portion 154 are subjected to certification testing by the time that the device 100 is shipped.

Figure 5:
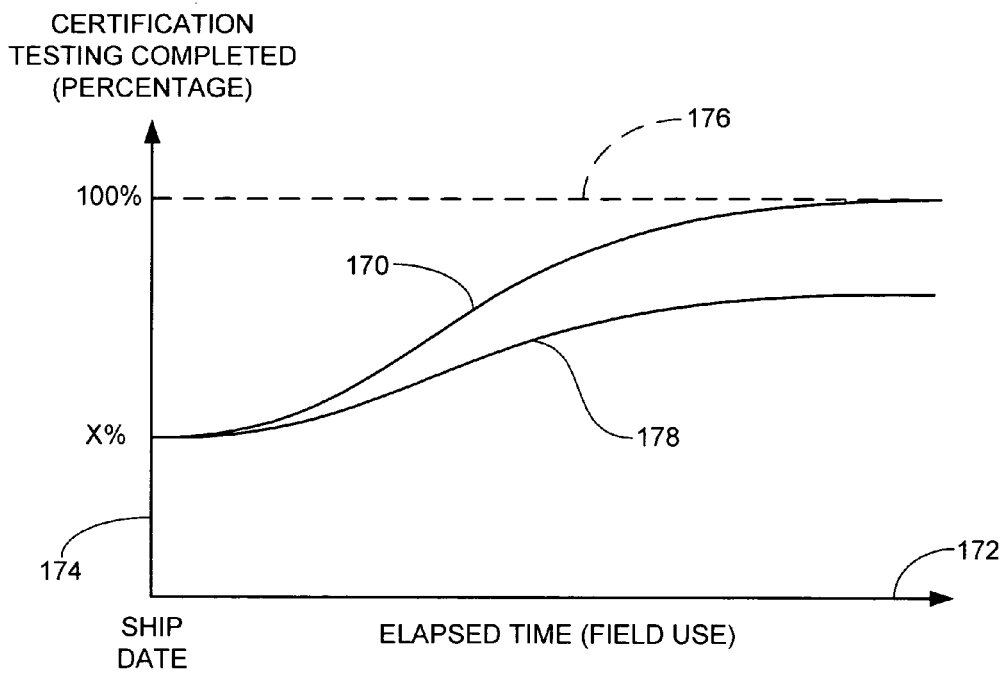
FIG. 5 is a graphical representation of a preferred use of the QOS data of FIG. 4 to provide block level certification tracking during field use of the device by an end user.

This is graphically represented in FIG. 5, which shows a block certification curve 170 plotted against an elapsed time x-axis 172 and a percentage of blocks completed y-axis 174. At the completion of the manufacturing of the device 100, only X % of the data blocks 144 are certified (X<100%). Additional blocks 144 are subjected to certification testing by the device during "field use" of the device 100.

Such field-level certification testing preferably takes place at appropriate times, such as during idle periods, and will operate to gradually increase the number of certified blocks 144 up to the 100% level (broken line 176). Both the initial number of certified blocks, as well as the rate at which subsequent blocks are certified, will be set depending on the requirements of a given application.

The QOS data is preferably used to control this post-shipment certification process, and provides an indication of the certification state for each of the blocks 144. One preferred approach is to provide a marker within the QOS data to individually identify each of the blocks 144 that have been successfully certified, and which have not. Defect mapping and lists can be subsequently generated in response to the results of this field-level certification testing.

It will be appreciated that the one-to-one correspondence between LBAs and the associated physical blocks 144 may be preset during manufacturing. While simplifying device complexity, it is possible under such a scenario that during subsequent field use the host device may issue a command to store data at an LBA for which the corresponding block 144 is not yet certified. This is preferably handled in a fashion transparent to the user by storing the received data to another block 144 that has been successfully certified. Once the blocks at the associated LBA(s) have been successfully certified, the data can then be transferred to these blocks.

Alternatively, when data are to be written to LBAs which have not yet been certified, the data can be written to different locations of the media so that multiple copies of the data are stored. This enhances data integrity in that there is a greater likelihood of being able to successfully retrieve the data later. As before, subsequent background processing can be applied to certify the blocks at the target LBAs, after which the originally written data are moved to these blocks and the remaining blocks used to store the additional copy or copies of the data are returned to the available block pool.

In another alternative embodiment, an internal LBA-to-PBA adjustment can be made so that the blocks 144 that initially receive the stored data are thereafter identified with the corresponding LBAs. In this way, LBAs are mutably associated with the corresponding PBAs on an as needed basis.

In an alternative approach, the data are written to the target non-certified blocks 144 in such a way as to ensure the integrity of the data transfer, such as a write followed by an immediate read verification operation to ensure the data can be successfully retrieved. Other approaches to storing data to non-certified blocks 144 include the calculation and storage of multi-block level parity values, and the use of lower data storage density techniques. The QOS data preferably serves to track these and various other parameters for each block 144 to identify the associated characteristics of the affected block(s).

While in a preferred embodiment the device 100 operates in the background to bring the total number certified blocks 144 in the data storage portion 154 up to 100%, such is not necessarily required. In alternative embodiments, the device 100 is configured to monitor host accesses and data storage utilization rates in order to maintain a selected margin of available blocks in a certified state.

For example, the controller 126 can be configured to maintain at least 25% (or some other number) of the total unused blocks 144 in the storage portion 154 in a certified state. Additional offline certifications are performed as blocks 144 are allocated for use by the host in order to maintain this margin.

Depending on host utilization rates, this may result in some unused blocks 144 never being certified by the end of the operational life of the device 100, such as generally indicated by certification rate curve 178 in FIG. 5. This can advantageously provide a number of benefits, such as reduced power consumption requirements and overhead processing demands.

Virus Scans

The QOS data can additionally, or alternatively, be used in conjunction with periodic virus scans of the memory space 150. As will be recognized, a virus can generally be characterized as a malicious routine introduced by a third party source that undesirably interferes with the intended operation of the device 100. A virus attack can undesirably result in the corruption of data, or even permanent damage to the device 100.

A variety of virus scanning techniques have been proposed in the art to enable a user to periodically scan various files in a device in an attempt to identify the presence of viruses. Such techniques can include comparison of files in a device to a library list of known malicious virus files.

Figure 6:
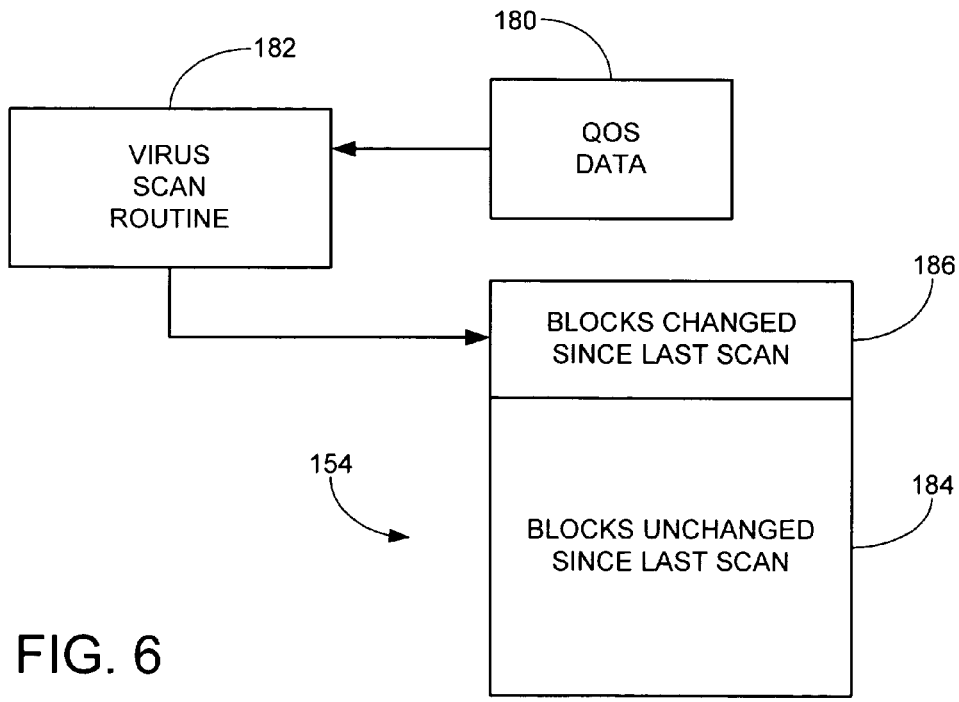
FIG. 6 shows a functional representation of a preferred use of the QOS data in conjunction with the execution of a virus scan on physical blocks used to store user data.

The QOS data are preferably used in conjunction with such virus scans by identifying, at an addressable block level, which blocks 144 have been altered (e.g., written to) since the most recent scan. As shown in FIG. 6, the QOS data (block 180) are preferably accessed to provide an input to a virus scan routine 182. In response, the virus scan routine 182 limits the virus scan operation to only those blocks 144 which remain unchanged since the most recent scan operation. As illustrated in FIG. 6, the population of blocks that have been changed (subset 184) may be significantly less than those blocks that not been changed (subset 186) since the most recent scan operation.

In this way, the QOS data 180 advantageously increases the efficiency of a virus scan operation, by providing an indication of virus scan status at a block level.

It will be appreciated that this can be used in conjunction with, without replacing, file level scan status tracking systems that identify files that have (or have not) been changed since the most recent scanning operation. Files can generally be of any size and are typically stored across an associated number of blocks 144. When a file is updated by the user, it is often the case that some, but not all, of the associated blocks 144 will be changed.

Thus, in some preferred embodiments the virus scan routine 182 operates to track files that have been changed since the most recent scan operation, while the device 100 separately tracks changes to individual blocks 144 via the QOS data 180. Thereafter, upon operation of the virus scan routine 182, the routine identifies the files that require scanning, and the QOS data 180 indicates which blocks of these files can be exempted from the scan.

In some related embodiments, the QOS data 180 further signal to the routine 182 to include additional blocks 144 not identified at the file level which require scanning. In this way, a more efficient scanning operation is achieved, which allows the scanning to take place more frequently without adversely affecting availability of the system to the user.

The QOS data can further be supplied with intelligence to distinguish between updates that are externally generated, as compared to updates that are internally generated. For example, as discussed above data stored to the memory space 150 may be initially stored in a first location (first set of blocks 144), but then later moved to a second location (second set of blocks 144).

This is preferably carried out by performing the requisite operates to read the first set of blocks, temporarily storing this readback data in the buffer 132 (FIG. 1), and then scheduling a write operation to write this readback data to the second set of blocks. In such a case, there is little or no risk that malicious code would operate to affect the readback data prior to writeback. Accordingly, if the QOS data indicated that the first set of blocks had been unchanged, this same status is preferably transferred to the second set of blocks as well.

In a preferred embodiment, at least one bit in the QOS data 180 is reset (such as to a logical "0") globally for all of the blocks 144 upon each operation of the virus scan routine 182. Thereafter, this at least bit is altered (such as to a logical "1") for each block 144 affected by a data change (host access operation, etc.). Thus, at the time of the next virus scan operation, those blocks 144 with unchanged bit(s) can be readily identified and exempted.

Access History

Figure 7:
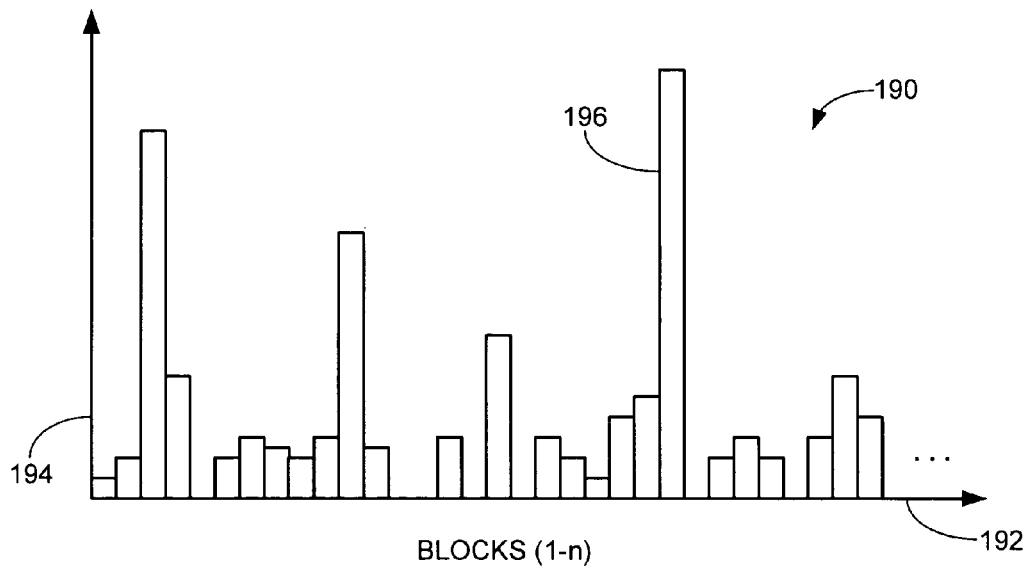
FIG. 7 provides a histogram to represent a preferred use of the QOS data to track the number of data access operations upon various physical blocks used to store user data.

Another preferred use for the QOS data is in accumulating the total number of access operations that have taken place upon individual blocks 144. FIG. 7 provides a generalized histogram representation of accumulation data 190 plotted against a block PBA x-axis 192 and a quantity of accesses y-axis 194. The data 190 shown in FIG. 7 are merely for purposes of illustrating a simplified example, so that various alternatives are contemplated such as identifying accesses for defined sized groups of sequential blocks, etc. Similarly, the accesses can include both write and read operations, or these can be tracked separately.

The QOS data 190 is preferably accumulated as the respective types of accesses are performed on the associated blocks 144. Such data can be used to evaluate host access patterns and make adjustments, such as with read data caching and retention policies, to enhance transfer performance.

The QOS data 190 can further identify situations where LBA reallocation or other techniques may be required to enhance data recovery. For example, a significant recurrence of write operations to a selected block or blocks, such as indicated at 196, may indicate that adjacent track interference (ATI) issues may arise in the future. ATI arises from the cumulative effects of fringing fields from the transducer 112 that may, over time, degrade the ability to recover the data on adjacent tracks.

Write Status

In further preferred embodiments, the QOS data are used to identify what is referred to herein as "write status," which generally comprises a characteristic state of a track (or a portion thereof) in preparation of, or after, the writing of data thereto.

Figure 8:
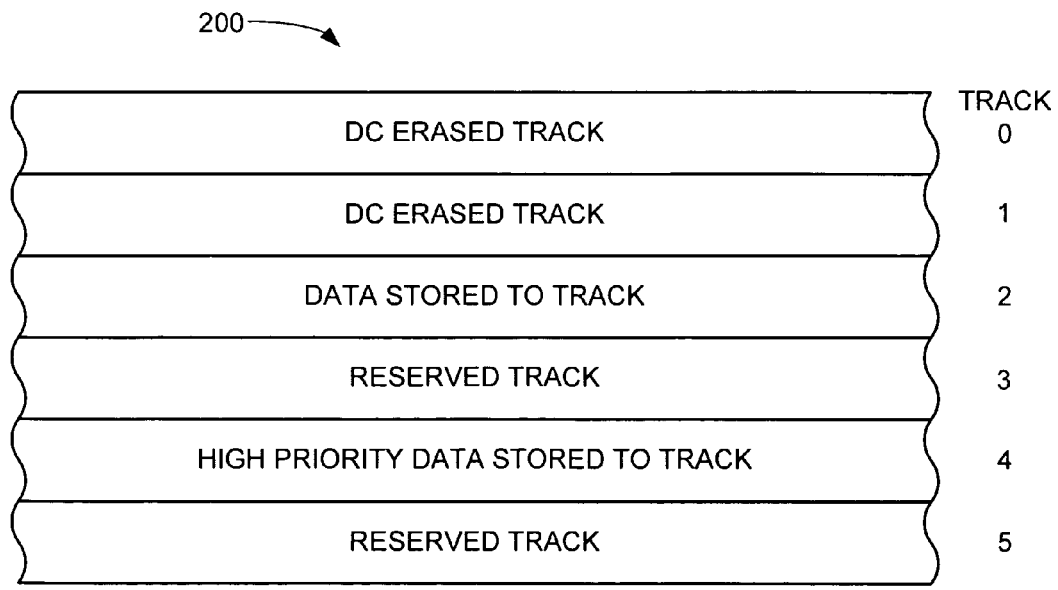
FIG. 8 shows a number of adjacent tracks of the memory space to show a preferred use of the QOS data to indicate various storage configurations of physical blocks on said tracks.

FIG. 8 shows a plurality of adjacent tracks 200 on a selected one of the media 110. The tracks are arbitrarily denoted as Tracks 0-5, and each represent all or a portion of the physical data blocks 144 (not separately shown) thereon.

Tracks 0 and 1 are identified as "DC ERASED TRACKS," which corresponds to a preparation state whereby a dc erase operation has taken place on the data blocks thereof. As will be recognized, data are often written to a selected block 144 irrespective of the previous magnetization pattern that was present on the block 144. Transducers 112 are generally configured to provide sufficiently strong magnetic write fields so that this prior magnetization of the block 144 does not substantially interfere with the new desired magnetization pattern; that is, the old pattern is simply overwritten by the new pattern.

In some applications, however, it can be desirable to initially prepare one or more blocks 144 prior to the writing of data thereto in order to enhance a data integrity level for the written data. One well-known approach is to use the aforementioned dc erase technique whereby the block is "erased" by applying a uniform magnetization in a selected direction.

In accordance with preferred embodiments, the QOS data are used to identify blocks that have been dc erased such as on Tracks 0 and 1, thereby identifying suitable locations within the memory space 150 to receive higher priority data. A tabulation of such QOS data can be readily sorted to identify the size and number of such concurrently disposed locations to aid in the data management decisions of the controller 134.

Track 2 provides another preferred QOS data characteristic identified as "DATA STORED TO TRACK," indicative of blocks that have received stored data. While host level file systems often track utilization, such is at an LBA basis. Thus, it can be useful to further identify at a block level which PBAs currently store user data apart from, and in addition to, such file level tracking systems.

Tracks 3-5 are a set of tracks with Track 4 identified as "HIGH PRIORITY DATA STORED TO TRACK," and Tracks 3 and 5 identified as "RESERVED TRACKS." In this case, the QOS data indicate that data of particularly high priority have been stored to the blocks 144 on Track 4, and that the associated blocks 144 on Tracks 3 and 5 have been reserved (e.g., write protected) to provide a buffer to the high priority data.

As with the certification testing described above, in some applications it may be desirable to maintain a selected number of data blocks 144 in a particular write state, such as dc erased (see Tracks 0 and 1). Thus, in some preferred embodiments the controller 126 operates to maintain a pool of selected size of dc erased blocks 144 to accommodate high priority data. Additional blocks 144 are dc erased as host writes take place in order to maintain this available pool.

Overlapped Tracks

Figure 9:
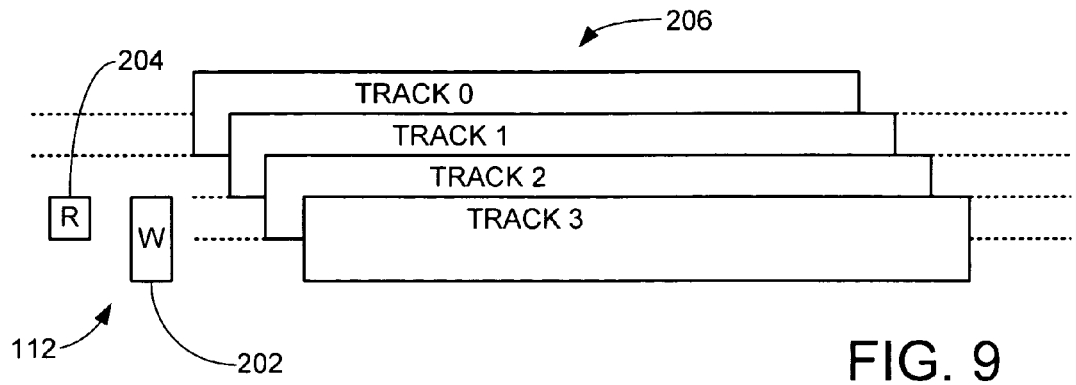
FIG. 9 illustrates an overlapping data write technique that can be advantageously employed by the device of FIG. 1 in conjunction with preferred embodiments.

Each transducer 112 of the device 100 preferably has separate write (W) and read (R) elements 202, 204, as shown in FIG. 9. The write element 202 preferably comprises an inductive vertical or horizontal writer. The read element 204 can have any number of desired constructions including magneto-resistive (MR), spin-valve (SV), tunneling giant MR (TGMR), etc.

This advantageously allows the use of intentionally overlapped tracks, as shown at 206 in FIG. 9. The tracks 206, denoted as Tracks 0-3, are each sequentially written with an initial width that substantially conforms to the effective operational width of the write element 202. Each subsequent track is intentionally overlapped onto a prior track by a selected amount so that the remaining, non-overlapped portion is sufficiently wide to enable the read element 204 to recover the non-overlapped data.

It will be appreciated that this approach generally increases the overall storage capabilities of the media 110, since a larger number of data tracks can be formed on a given media surface. Some measure of complexity to the data management system is added, however. For example, if the data written to Track 1 in FIG. 9 needs to be updated, in order to rewrite that data to the same location, it is generally necessary to readback and then sequentially rewrite the associated data on Tracks 2 and 3 as well.

That is, in order to write new data to Track 1, the associated contents of Tracks 2 and 3 are cached in the buffer 132. The new data are then written to Track 1 during a first pass of the transducer 112, followed by the sequential rewriting of the data to Tracks 2 and 3 during subsequent passes.

Figure 10:
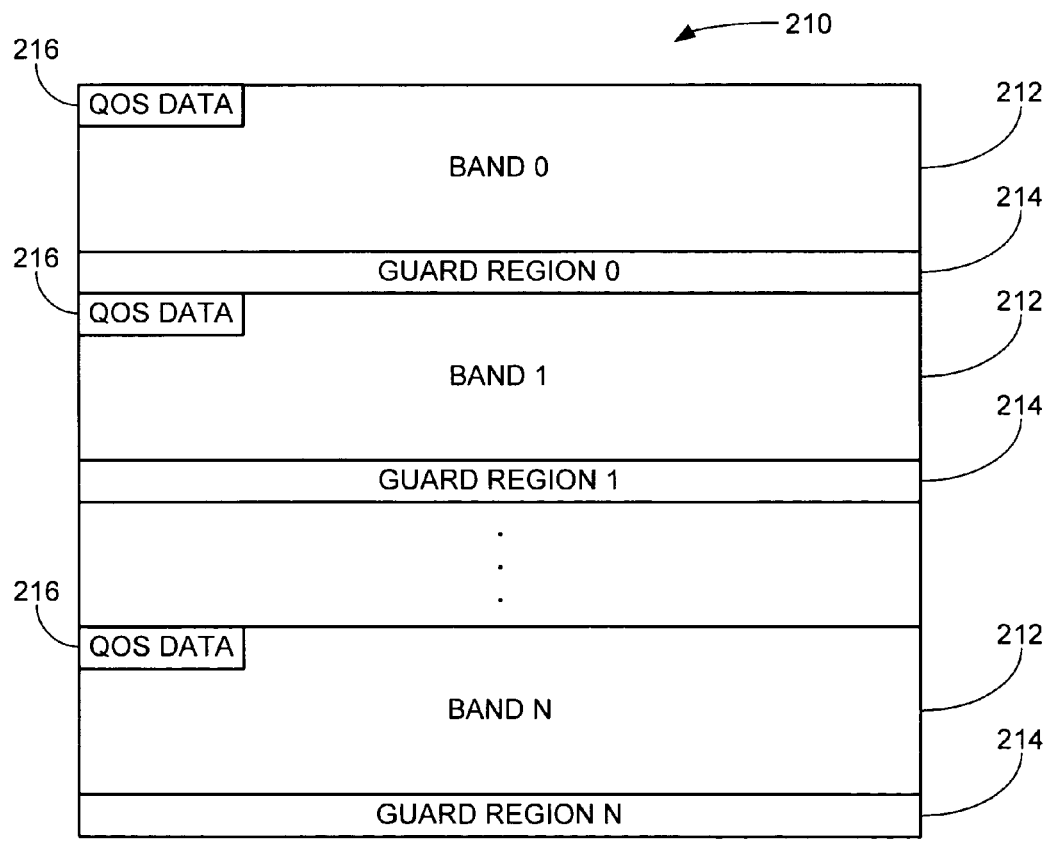
FIG. 10 provides a generalized structure for a portion of the memory space of the device with bands of overlapping tracks as shown in FIG. 9.

Groups of adjacent, overlapped tracks are preferably arranged into bands 210, as shown by Bands 0-N in FIG. 10. Each band 210 preferably comprises a plurality of overlapped tracks 212 and a guard region 214 which separates each band from the next adjacent band. All, or only some, of the data blocks 144 in the block data storage portion 154 can be arranged into the bands 210 of FIG. 10, as desired.

Each band 210 is preferably treated as a pool of physical data blocks 144 assigned to one or more corresponding ranges of LBAs. QOS data for the blocks 144 can be stored separately in the QOS portion 158 of FIG. 4 discussed above. Additionally or alternatively, the QOS data is preferably stored in QOS data regions 216 in each band 210, as shown.

The QOS data for each band 210 provides characteristic quality of service data for each of the individually addressable blocks 144 as before; hence, each of the foregoing exemplary types of QOS data (block certification, virus scan, number of accesses, write status, etc.) can be maintained for the blocks 144 in the overlapped tracks 206 as well. Additionally, as desired the QOS data (such as in separate portion 158) can further identify a status of whether the associated block 144 is an overlapped block, as well as which band the overlapped block 144 is associated with.

The QOS data in regions 216 can further indicate the status of all of the blocks in the associated band 210; for example, the QOS data for Band 0 can provide a global indication that all of the blocks 144 therein are certified, dc erased, etc.

QOS Data Management

Figure 11:
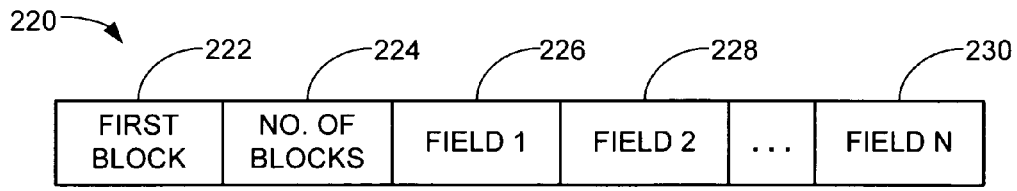
FIG. 11 illustrates a preferred format for a QOS data entry.

The format for the QOS data will generally vary depending on the requirements of a given application, including the various type or types of quality of service characteristics indicated by the QOS data. FIG. 11 provides an exemplary format for a QOS data entry 220.

The entry 220 preferably includes a first block field 222 which identifies the first block, such as via PBA. A number of blocks field 224 identifies a total number of blocks sequentially occurring after the first block identified in field 222. Thus for example, 10 blocks arbitrarily identified with PBAs of 0-9 would identify the first block (0) in field 222 and the total number of blocks (10) in field 224.

It will be appreciated that from a data management standpoint, preferably each of the entries 220 provides QOS data for a plurality of blocks 144, such as all of the blocks on a given track or all of the blocks in a particular band. However, as desired individual entries 220 can be provided for individual blocks 144.

A number of fields from 1-N are next shown at 226, 228 and 230. Each field provides specific indicators of the QOS characteristics for the blocks of fields 222, 224. In one embodiment, the QOS entry relates specifically to one type of QOS characteristic, such as certification status. In this case, field 226 is preferably used to identify those blocks within the associated range that are still not yet successfully certified. As time proceeds and more and more blocks 144 undergo certification, updated lists can be provided in the remaining fields 228, 230, etc.

In another embodiment, the QOS entry 220 uses each of the different fields 226, 228, 230 for a different one of a number of different QOS characteristics. For example, field 226 identifies those blocks that have (or have not) yet been certified; field 228 provides virus scanning status; field 230 provides accumulation values, and so on. In this embodiment, updated activity to the blocks 144 result in the updating of the QOS data in the associated fields 226, 228, 230.

From the foregoing it will be appreciated that the QOS data relate to characteristics of the physical data blocks 144 that are "in service;" that is, blocks that are available (or potentially available) to receive data from a host. Hence, those skilled in the art will readily understand that the QOS data are preferably arranged and maintained to identify characteristics of non-defective and hence, unavailable data blocks. Separate defect logs are preferably prepared and maintained in addition to the QOS data to exclude such defective blocks from the available memory space.

Figure 12:
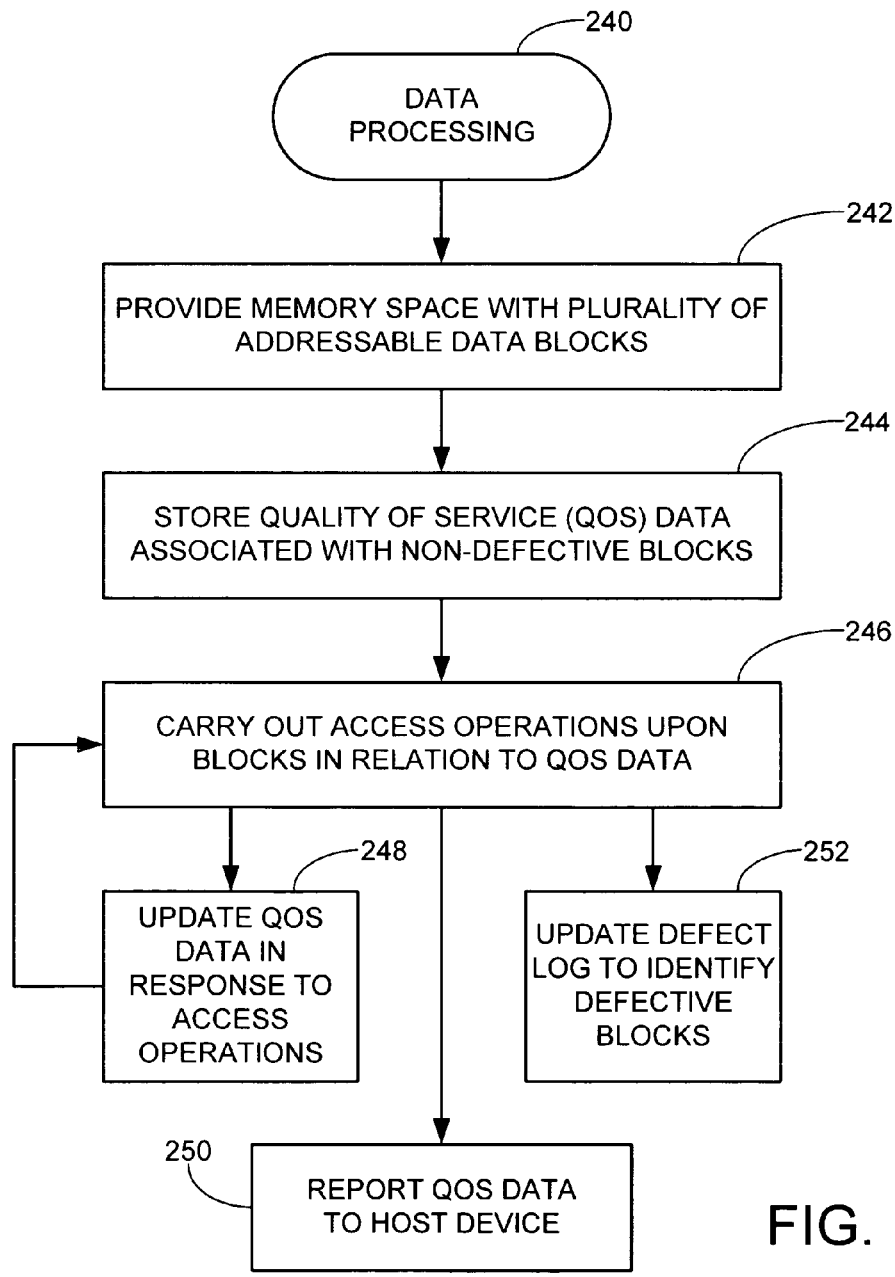
FIG. 12 is a flow chart for a DATA PROCESSING routine illustrative of preferred steps carried out in accordance with preferred embodiments of the present invention.

A DATA PROCESSING routine 240 is set forth in FIG. 12 to summarize preferred steps carried out in accordance with the foregoing preferred embodiments. At step 242, a memory space such as 150 is initially provided having a plurality of addressable data blocks such as 144. Preferably, each of the physical data blocks 144 are provisioned with a physical block address (PBA), and these PBAs are associated with corresponding logical block addresses (LBAs) at a host level.

Quality of service (QOS) data associated with non-defective blocks are next generated and stored at step 244. As discussed above, the QOS data identify one or more quality of service characteristics for non-defective blocks and can include certification status, virus scan status, access history, write status, overlapped track status, and so on. It is contemplated that an initial set of QOS data will be generated during device manufacturing, and that this QOS data will be updated during subsequent processing.

Host access operations are carried out at step 246 to transfer data between the memory space 150 and a host device in relation to the QOS data. As desired, the QOS data is updated in response to such access operations at step 248. QOS data (or a portion thereof) are further reported to the host device at step 250, such as with regard to historical data (number of accesses such as 190 in FIG. 7), virus scan data (block 180 in FIG. 6), etc. A defect log is further optionally updated at step 252 to identify defective blocks encountered during data transfers or offline certification.

From the foregoing discussion it will now be appreciated that the various preferred embodiments presented herein provide advantages over the prior art. Providing QOS data at a block level facilitates a significant amount of flexibility in the management of the memory space of a data storage device.

Block level certification can take place over time and after device manufacturing and shipment, which advantageously shortens manufacturing cycle times. Access histories can provide inputs for virus scanning routines as well as other data management planning to avoid, for example, ATI issues. Track write characteristics such as dc erase status or reserved boundary tracks can also be readily stored and reported.

While preferred embodiments have been presented in the environment of a disc drive data storage device, such is not limiting; rather, any number of different types of storage devices, including devices that provide solid-state memory locations, can readily be used as desired.

For purposes of the appended claims, it will be understood that the phrase "quality of service" refers to characteristic data associated with the transfer of data to an available non-defective data storage block, and hence will exclude defect logs, host level data, servo compensation data, and the like.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

What is claimed is:

1. A method comprising steps of:
   storing in a memory space quality of service (QOS) data associated with each of a plurality of physical data storage blocks in the memory space available to store user data for a host device;
   performing certification testing on less than all of the data storage blocks during manufacturing of a data storage device to provide a first subset of tested data storage blocks with a certification state indication in said QOS data and a second subset of untested data storage blocks having a non-certified state; and
   releasing the device to an end user with both the first subset of tested data storage blocks as well as the second subset of a remaining number of untested data storage blocks having the non-certified state indication in the QOS data, and subsequently performing certification testing on at least one of the remaining number of untested data storage blocks to maintain at least a predetermined percentage of a total number of unused tested data storage blocks that have a certification state indication in the QOS data.

2. The method of claim 1, further comprising a step of:
   performing a host access operation to transfer user data between at least one of the plurality of physical data storage blocks and the host device in relation to the QOS data.

3. The method of claim 2, further comprising a step of updating the QOS data in relation to the host access operation of the performing step.

4. The method of claim 2, further comprising a step of reporting at least a selected portion of the QOS data to the host device in relation to the host access operation of the performing step.

5. The method of claim 1, wherein the QOS data identifies a certification state for each data storage block, wherein at least one data storage block is identified by the QOS data as having been certified, and wherein at least one data storage block is identified by the QOS data as not yet having been certified.

6. The method of claim 5, further comprising a step of storing host data to a data storage block in which the associated QOS data identifies the data storage block as not yet having been certified.

7. The method of claim 5, further comprising steps of receiving host data to be stored to a first data storage block when the associated QOS data identifies the first data storage block as not yet having been certified, temporarily storing the host data to a second data storage block, certifying the first data storage block, and then transferring the host data from the second data storage block to the first data storage block.

8. The method of claim 1, further comprising a step of updating the QOS data in response to the certification testing of the performing step.

9. The method of claim 1, further comprising a step of maintaining a defect log separately from the QOS data that identifies defective data storage blocks in the memory space.

10. The method of claim 1, wherein the QOS data comprises at least a selected one of a virus scan status, an access history, a write status and an overlapped track indication for each said data storage block to provide an indication of a reliability of the associated data storage block.

11. The method of claim 1, wherein the QOS data are formatted using a plurality of entries each identifying a physical block address (PBA) of one or more of the data storage blocks and comprising a plurality of fields each storing associated QOS data for a different characteristic of the associated one or more of the data storage blocks.

12. The method of claim 1, wherein the certification testing is performed on less than all the data storage blocks available to store user data.

13. The method of claim 1, wherein the predetermined percentage is maintained at 25% of the total number of unused tested data storage blocks that have a certification state indication in a QOS data field.

14. An apparatus comprising a memory space comprising a plurality of physical data storage blocks available to store user data for a host device, the memory space further storing quality of service (QOS) data associated with each of said data storage blocks to provide an indication of a reliability of each said data storage block, wherein a plurality of data storage blocks, less than all of said data storage blocks, are subjected to certification testing during manufacturing prior to shipment to an end user so that, upon said shipment, the device comprises a first subset of tested data storage blocks having a certification state indication in the QOS data, a second subset of tested data storage blocks excluded from available memory space due to a defective state, and a subset of untested data storage blocks having a non-certified state indication in the QOS data, wherein the apparatus is adapted to perform subsequent certification of said untested data storage blocks in relation to a rate at which said tested data storage blocks are allocated for storage of user data.

15. The apparatus of claim 14, further comprising a controller configured to perform a host access operation to transfer user data between at least one of said data storage blocks and a host device in relation to the QOS data.

16. The apparatus of claim 14, wherein the QOS data identifies a certification state for each said data storage block, wherein at least one said data storage block is identified by the QOS data as having been successfully certified, and wherein at least one said data storage block is identified by the QOS data as not yet having been successfully certified.

17. The apparatus of claim 14, further comprising a controller which performs said subsequent certification testing on at least selected data storage blocks from the population of said data storage blocks provided in an uncertified state after shipment of the device to the end user to maintain a predetermined number of tested data storage blocks available for allocation for storage of user data.

18. The apparatus of claim 14, wherein the QOS data comprises at least a selected one of a virus scan status, an access history, a write status, or an overlapped track indication for each said data storage block.

19. The apparatus of claim 14, wherein certification testing is selectively engaged to maintain a predetermined margin of available data storage blocks in a certified state.

20. The apparatus of claim 14, wherein only a portion of the subset of untested data storage blocks that is less than the total number of untested data storage blocks undergoes certification testing.

21. The apparatus of claim 14, wherein the predetermined percentage is maintained at 25% of the total number of unused tested blocks that have a certification state indication in a QOS data field.

22. A method comprising the steps of:
  storing in a memory space QOS data associated with each of a plurality of physical data storage blocks in the memory space available to store user data for a data storage device;
  performing certification testing on a fractional portion of the data storage blocks during manufacturing of the data storage device to provide a first subset of tested data storage blocks with a certification state indication in the QOS data, and to provide a second subset of untested data storage blocks; and
  releasing the device to an end user with the first subset and the second subset, certification testing being subsequently performed at the end user site on the second subset to maintain a predetermined percentage of unused data storage blocks having the certification state indication in the QOS data.

23. The method of claim 22, further comprising the step of:
  performing a host access operation to transfer user data between at least one of the physical data storage blocks and a host device in relation to the QOS data.

24. The method of claim 23, further comprising the step of:
  updating the QOS data in relation to the host access operation of the performing step.

25. The method of claim 22, wherein the QOS data identifies a certification state for each data storage block, wherein at least one data storage block is identified by the QOS data as having been certified, and wherein at least one data storage block is identified by the QOS data as not yet having been certified.

26. The method of claim 22, further comprising steps of receiving host data to be stored to a first data storage block when the associated QOS data identifies the first data storage block as not yet having been certified, temporarily storing the host data to a second data storage block, certifying the first data storage block, and transferring the host data from the second data storage block to the first data storage block.

27. The method of claim 22, further comprising the step of:
  maintaining a defect log separately from the QOS data that identifies defective data storage blocks in the memory space.

28. The method of claim 22, wherein the QOS data comprises at least a selected one of a virus scan status, an access history, a write status and an overlapped track indication for each data storage block to provide an indication of reliability of the associated data storage block.

29. The method of claim 22, wherein the QOS data are formatted using a plurality of entries each identifying a physical block address (PBA) of one or more of the data storage blocks and comprising a plurality of fields, each field storing associated QOS data for a different characteristic of the associated data storage blocks.

* * * * *